US010158133B2

(12) United States Patent
Ok et al.

(10) Patent No.: US 10,158,133 B2
(45) Date of Patent: Dec. 18, 2018

(54) FUEL CELL SYSTEM AND METHOD FOR CONTROLLING THE SAME

(71) Applicant: Hyundai Motor Company, Seoul (KR)

(72) Inventors: Sungsuk Ok, Gyeonggi-do (KR); Kyuil Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 196 days.

(21) Appl. No.: 15/239,618

(22) Filed: Aug. 17, 2016

(65) Prior Publication Data

US 2017/0294665 A1  Oct. 12, 2017

(30) Foreign Application Priority Data

Apr. 8, 2016  (KR) .................. 10-2016-0043114

(51) Int. Cl.
*H01M 8/04* (2016.01)
*H01M 8/04664* (2016.01)
*H01M 8/04223* (2016.01)
*H01M 8/0438* (2016.01)
*H01M 8/1018* (2016.01)

(52) U.S. Cl.
CPC ... *H01M 8/04686* (2013.01); *H01M 8/04231* (2013.01); *H01M 8/04388* (2013.01); *H01M 2008/1095* (2013.01); *H01M 2250/20* (2013.01)

(58) Field of Classification Search
CPC ......... H01M 8/04686; H01M 8/04231; H01M 8/04388; H01M 2008/1095; H01M 2250/20
See application file for complete search history.

(56) References Cited

U.S. PATENT DOCUMENTS

2009/0117420 A1*  5/2009  Nakakubo ......... H01M 8/04089
429/410

FOREIGN PATENT DOCUMENTS

| EP | 2597713 A1 * | 5/2013 | ........ H01M 8/04686 |
|----|----|----|----|
| JP | 2003-308868 A | 10/2003 | |
| JP | 2005529463 A | 9/2005 | |
| JP | 2005302563 A | 10/2005 | |
| JP | 2006134647 A | 5/2006 | |
| JP | 2008071734 A | 3/2008 | |
| JP | 2013-114850 A | 6/2013 | |
| JP | 2013239360 A | 11/2013 | |
| KR | 2009-0036594 A | 4/2009 | |
| KR | 10-2010-0008496 U | 8/2010 | |

* cited by examiner

*Primary Examiner* — Renee Luebke
*Assistant Examiner* — Paul Baillargeon
(74) *Attorney, Agent, or Firm* — Mintz Levin Cohn Ferris Glovsky and Popeo, P.C.; Peter F. Corless

(57) ABSTRACT

A fuel cell system is provided. The system includes a fuel cell stack, a plurality of valves operated to be selectively opened or closed to supply fuel to the fuel cell stack and remove impurities, and a pressure sensor that detects a state of pressure of fuel supplied to the fuel cell stack. A fuel cell controller then determines whether the pressure sensor or the plurality of valves are faulty by comparing increase or decrease time of the pressure detected by the pressure sensor with a reference range of time delay, as the plurality of valves are operated to be opened or closed.

17 Claims, 8 Drawing Sheets

FUEL CELL SYSTEM AND METHOD FOR CONTROLLING THE SAME

CROSS-REFERENCE TO RELATED APPLICATION

This application claims priority to and the benefit of Korean Patent Application No. 10-2016-0043114, filed on Apr. 8, 2016, the disclosure of which is incorporated herein by reference in its entirety.

BACKGROUND

1. Field of the Invention

The present disclosure relates to a fuel cell system and method for controlling the same, and more particularly to a fuel cell system that diagnoses a failure in fuel supply to a fuel cell stack.

2. Discussion of Related Art

A fuel cell is a device that converts chemical energy from a fuel into electric energy through an electrochemical reaction in a fuel cell stack, supplying power not only for industry, home, and vehicles but also for small electric and electronic appliances.

As an example of the fuel cell, a polymer electrolyte membrane fuel cell (PEMFC) has been studied as a power supply source for driving vehicles. The PEMFC includes a membrane electrode assembly (MEA) in which catalytic electrode layers, on which electrochemical reactions occur, are attached on either sides of an electrolyte membrane through which hydrogen ions pass, a gas diffusion layer (GDL) that serves to uniformly distribute reacting gases and deliver the generated electric energy, gasket and clamping tools to maintain air tightness and proper clamping pressure of reacting gases and coolant, and a bipolar plate for moving the reacting gases and coolant.

When a vehicle is driven only by the aforementioned fuel cell, performance degradation occurs in a low-efficient operation area of the fuel cell. Thus, a high-voltage battery or a super capacitor that serves as a condenser for a supplementary power source may be used to provide power required to drive the motor, in addition to the main power source, the fuel cell. The fuel cell vehicle includes a fuel storage tank, and adjusts a desired electrical output from the fuel cell by adjusting pressure of hydrogen and oxygen supplied from the high pressure storage tank to a fuel cell unit. To obtain a desired electrical output from the fuel cell, it is important to manage smooth (e.g., constant) supply of fuel from the fuel storage tank to the fuel cell unit.

SUMMARY

The present disclosure provides a fuel cell system and method for controlling the same, with which fault and failure in supplying fuel such as hydrogen and oxygen supplied to a fuel cell stack may be diagnosed.

In accordance with one aspect of the present disclosure, a fuel cell system may include: a fuel cell stack; a plurality of valves operated to be selectively opened/closed to supply fuel to the fuel cell stack and remove impurities; a pressure sensor configured to detect a state of pressure of fuel supplied to the fuel cell stack; and a fuel cell controller configured to determine whether the pressure sensor or the plurality of valves are faulty by comparing increasing or decreasing time of the pressure detected by the pressure sensor with a reference range of time delay, as the plurality of valves are operated to be opened/closed.

The plurality of valves may include a fuel supply valve, a purge valve, a drain valve, and an air blocking valve. The fuel supply valve may include a hydrogen supply valve or an air supplier. The fuel cell controller may be configured to determine whether the pressure is increasing normally by comparing pressure increase time taken for a value of the pressure sensor to increase up to (e.g., reach) a reference value with the reference range of time delay, as the fuel supply valve is opened. The fuel cell controller may be configured to determine that the pressure sensor is faulty or the fuel supply valve has failed to be opened or closed when the pressure increase time is beyond the reference range of time delay.

The fuel cell controller may be configured to determine a state of the purge valve and the discharging state by comparing pressure increase time taken for a value of the pressure sensor to decrease down to a reference value with the reference range of time delay, as the purge valve is opened. The fuel cell controller may further be configured to detect a leak of fuel or a failure of the purge valve to be opened or closed when the pressure falling time is beyond the reference range of time delay. The fuel cell controller may be configured to determine a state of the drain valve and the discharging state by comparing pressure decrease time taken for a value of the pressure sensor to decrease down to a reference value with the reference range of time delay, as the drain valve is opened.

Additionally, the fuel cell controller may be configured to detect a leak of fuel or a failure of the drain valve to be opened or shut when the pressure decrease time is beyond the reference range of time delay. The fuel cell controller may be configured to determine a state of the purge valve, a state of the drain valve and the discharging state by comparing pressure decrease time taken for a value of the pressure sensor to decrease down to a reference value with the reference range of time delay, as the purge valve and the drain valve are both opened. The fuel cell controller may further be configured to determine whether the pressure sensor or the plurality of valves are faulty, and in response to determining that the pressure sensor or the plurality of valves are faulty, output an indication of the fault or operate an auxiliary power source, a battery.

In accordance with one aspect of the present disclosure, a method for controlling a fuel cell system may include: operating a plurality of valves of a fuel cell stack to be opened or closed; determining increasing or decreasing time of pressure detected by a plurality of pressure sensors; comparing the determined pressure increasing or decreasing time with a reference range of time delay; and determining from the comparison that the plurality of pressure sensors or the plurality of valves are faulty when the pressure increasing or decreasing time is beyond the reference range of time delay.

The plurality of valves may include a fuel supply valve, a purge valve, a drain valve, and an air blocking valve. The fuel supply valve may include a hydrogen supply valve or an air supplier. When the fuel supply valve is opened, the determination of when the pressure increasing or decreasing time is beyond the reference range of time delay from the comparison that the plurality of pressure sensors or the plurality of valves are faulty may include determining that the pressure sensor is faulty or a failure of the fuel supply valve has a failure to be opened or closed when the pressure increase time taken for a value of the pressure sensor to increase up to a reference value is beyond the reference range of time delay.

When the purge valve is opened, the determination of when the pressure increasing or decreasing time is beyond the reference range of time delay from the comparison that the plurality of pressure sensors or the plurality of valves are faulty may include detecting a leak of fuel or a failure of the purge valve to be opened or closed when the pressure decrease time taken for a value of the pressure sensor to decrease down to a reference value is beyond the reference range of time delay. In addition, when the drain valve is opened, the determination of if the pressure increasing or decreasing time is beyond the reference range of time delay from the comparison that the plurality of pressure sensors or the plurality of valves are faulty may include detecting a leak of fuel or a failure of the drain valve has a failure to be opened closed when the pressure falling time taken for a value of the pressure sensor to decrease down to a reference value is beyond the reference range of time delay.

When the purge valve and the drain valve are both opened, the determination of when the pressure increasing or decreasing time is beyond the reference range of time delay from the comparison that the plurality of pressure sensors or the plurality of valves are faulty may include determining that the purge valve and drain valve are faulty and the discharging state is abnormal when the pressure decrease time taken for a value of the pressure sensor to decrease down to a reference value is beyond the reference range of time delay.

A method for controlling a fuel cell system may further include: after determining from the comparison that the plurality of pressure sensors or the plurality of valves are faulty when the pressure increasing or decreasing time is beyond the reference range of time delay, outputting an indication of the fault or operating an auxiliary power source, a battery.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
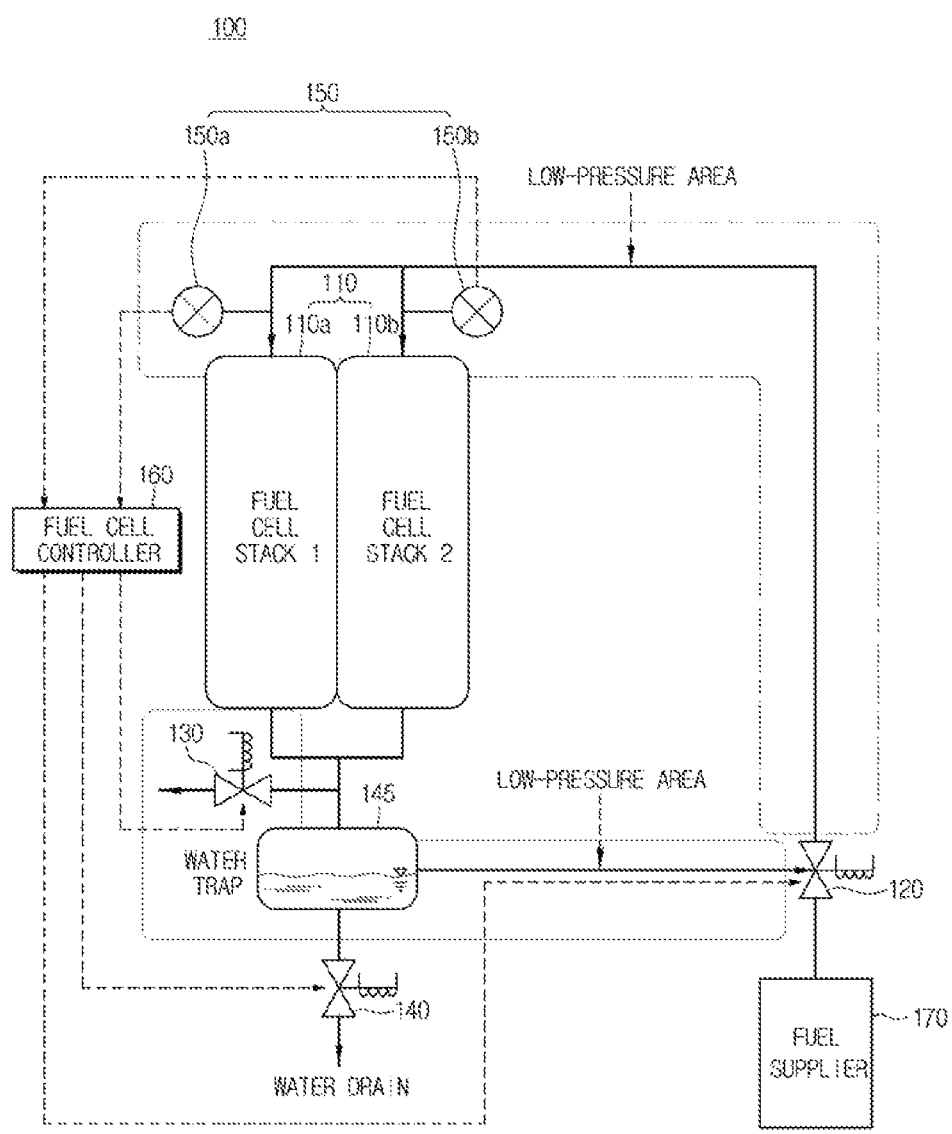
FIG. 1 is a block diagram of a fuel cell system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicies and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor.

The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure will now be described more fully with reference to the accompanying drawings, in which exemplary embodiments of the disclosure are shown. The disclosure may, however, be embodied in many different forms and should not be construed as being limited to the exemplary embodiments set forth herein; rather, these embodiments are provided so that this disclosure will be thorough and complete, and will fully convey the concept of the disclosure to those skilled in the art. Like reference numerals in the drawings denote like elements, and thus their description will be omitted. In the description of the present disclosure, if it is determined that a detailed description of commonly-used technologies or structures related to the embodiments of the present disclosure may unnecessarily obscure the subject matter of the invention, the detailed description will be omitted. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Exemplary embodiments of the present disclosure will now be described with reference to accompanying drawings.

Figure 2:
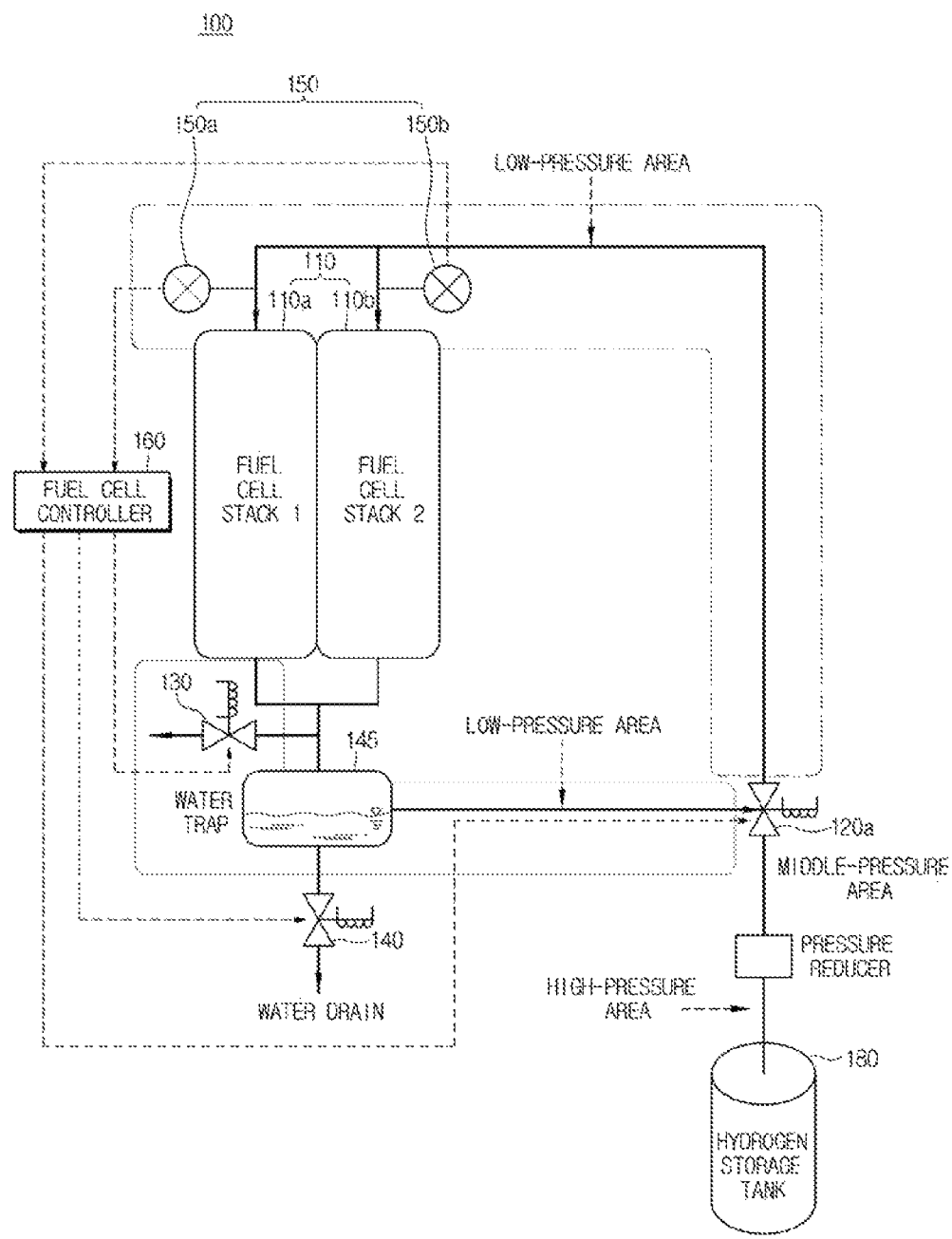
FIG. 2 is a block diagram of a hydrogen supply system according to an exemplary embodiment of the present disclosure.
Figure 3:
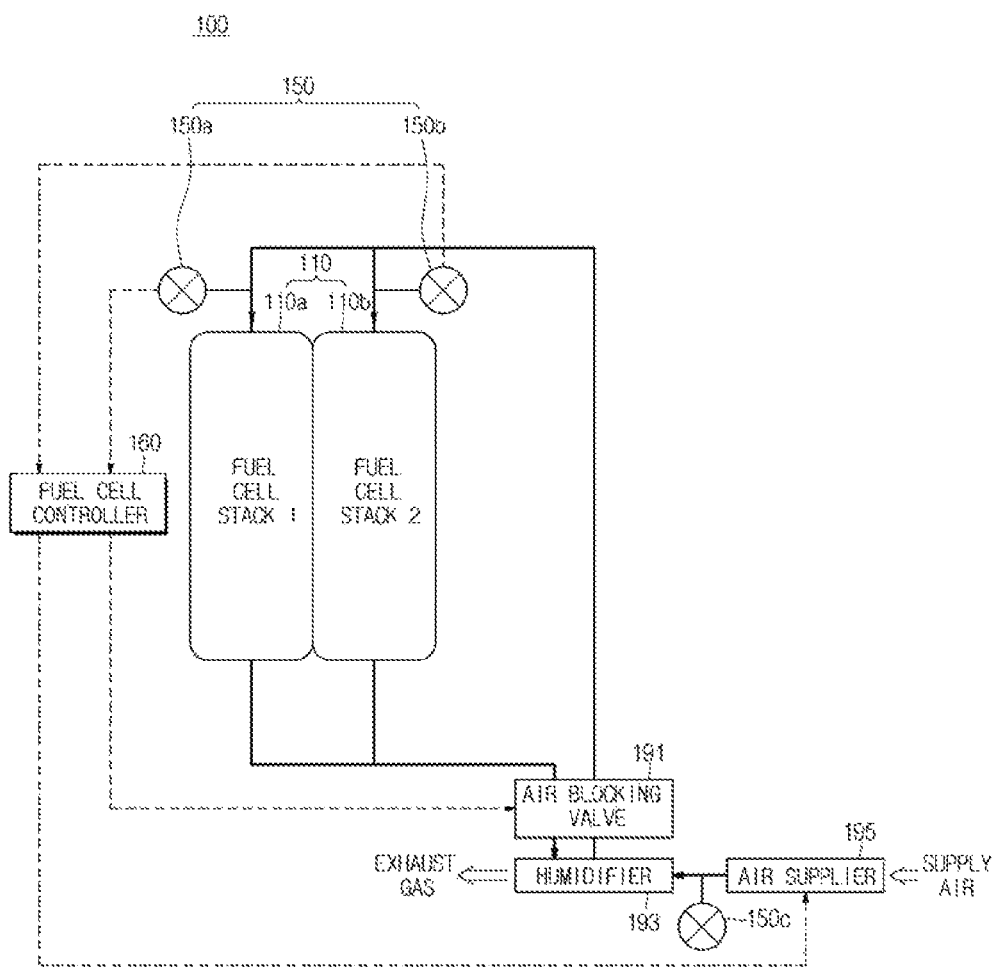
FIG. 3 is a block diagram of an oxygen supply system according to an exemplary embodiment of the present disclosure.

FIG. 1 is a block diagram of a fuel cell system, FIG. 2 is a block diagram of a hydrogen supply system, and FIG. 3 is a block diagram of an oxygen supply system. Referring to FIGS. 1 to 3, a fuel cell system 100 may include a fuel cell stack 110, a plurality of valves 120, 130, 140, 191, a pressure sensor 150, a fuel cell controller 160, and a fuel supplier 170. The controller 160 may be configured to execute and operate the various other components of the system.

In particular, fuel cell stack 110 may be configured to generate electricity by receiving fuel, hydrogen, and an oxidizer, air, and may include an air electrode and a fuel electrode. The fuel cell stack 110 may have a structure in which tens of unit cells are layered, each unit cell comprised of a membrane electrode assembly and a separator, and there may be multiple fuel cell stacks 110a, 110b having the structure. The membrane electrode assembly may include a polymer electrolyte membrane, onto either sides of which an air electrode (or cathode) and a fuel electrode (anode) may be attached.

In the unit cell of the fuel cell, the fuel, hydrogen, may be supplied to the anode (or fuel electrode) and an oxidizer, oxygen, may be supplied to the cathode (or air electrode). Hydrogen supplied to the anode loses an electron to become a proton, which then passes through the electrolyte membrane to the cathode, and the lost electron from the hydrogen works electrically in a circuit external to the fuel cell and then reaches the cathode. At the cathode, protons are combined with oxygen and electron to form water. At this time, electrons generated at the anode drive the motor of the fuel cell vehicle. The fuel cell stacks 110, 110b are connected in series or in parallel to form a single fuel cell, which may produce higher voltage than a single fuel cell stack 110a or 110b dose.

As an example of the fuel cell, there is a polymer electrolyte membrane fuel cell (PEMFC) that includes a membrane electrode assembly (MEA) in which catalytic electrode layers, on which electrochemical reactions occur, are attached on either sides of an electrolyte membrane through which hydrogen ions pass, a gas diffusion layer (GDL) that serves to uniformly distribute reacting gases and deliver the generated electric energy, gasket and clamping tools to maintain air tightness and proper clamping pressure of reacting gases and coolant, and a bipolar plate for moving the reacting gases and coolant. The plurality of valves 120, 130, 140, 191 may be configured to be selectively opened or closed to supply fuel to the fuel cell stack 110 or remove impurities. The plurality of valves 120, 130, 140, 191 may include a fuel supply valve 120, a purge valve 130, a drain valve 140, and an air blocking valve 191.

Particularly, the fuel supply valve 120 may be a hydrogen supply valve 120a shown in FIG. 2 or an air supplier 195 shown in FIG. 3. The air supplier 195 may be configured to serve as a valve in the form to supply outside air while operating, and may be included in the fuel supply valve 120. The air supplier 195 may also be implemented as an air compressor although not in the form of a valve. The fuel supply valve 120 may be configured to be selectively opened or closed to supply fuel to the fuel cell stack 110. For the oxygen supply system of FIG. 3, the fuel supply valve 120 may be replaced by the air supplier 195. In other words, as the air supplier 195 operates, air may be supplied. The air supplier 195 may be implemented as an air compressor as well.

When a fuel cell start sequence begins, the fuel supply valve 120 of the fuel supplier 170 (or the hydrogen storage tank 180) may be opened. For a hydrogen supply valve 120a of FIG. 2, supply pressure may decrease by a pressure reducing valve after the valve is opened. In addition, in the oxygen supply system of FIG. 3, when a fuel cell start sequence begins, air may be supplied by driving the air supplier 195. The purge valve 130 may be configured to purge hydrogens of the fuel cell stack 110. Specifically, the purge valve 130 may purge hydrogens at the fuel electrode of the fuel cell stack 110.

The drain valve 140 may be configured to exhaust the fuel cell stack 110 of water. Specifically, the drain valve 140 may be configured to drain condensate stored in a water trap 145 at a particular level, and may be implemented with a solenoid valve configured to selectively open/close a valve passage by an electronic signal (e.g., signal received from controller). The purge valve 130 and the drain valve 140 may be configured to be selectively opened or closed to remove impurities in the anode of the fuel cell stack 110. The water produced by electrochemical reactions in the fuel cell is produced inside the fuel cell stack 110, and requires smooth discharge from the fuel cell stack 110. When the water is not discharged sufficiently or smoothly from the inside of the fuel cell stack 110, a state of flooding may occur, interfering with supply of fuel, hydrogen, thereby degrading power generation performance of the fuel cell stack 110.

Furthermore, for the oxygen supply system of FIG. 3, the air blocking valve 191 may be configured to operate as what corresponds to the drain valve 140 or the purge valve 130 described above, i.e., it may be configured to exhaust air. The pressure sensor 150 may be configured to detect a state of pressure of fuel supplied to the fuel cell stack 110. Accordingly, the pressure sensor 150 may be disposed in the entrance (e.g., inlet) of the fuel cell stack 110, without being limited thereto. The pressure sensor 150 may also be discharge in the outlet of the fuel cell stack 110. The pressure sensor 150 may include multiple sensors 150a, 150b to correspond to the multiple fuel cell unit stacks of the fuel cell. Furthermore, for the oxygen supply system, the pressure sensor 150 may be additionally disposed between a humidifier 193 and the air supplier 195 (see 150c of FIG. 3).

The fuel cell controller 160 may be configured to determine an average difference between the multiple pressure sensors 150a, 150b, 150c and transmit an open command to the fuel supply valve 120 to maintain a calculated target pressure. Once the fuel supply valve 120 is opened in response to the command, fuel may be circulated in the fluid path by a mechanical part, such as an ejector (not shown). Furthermore, the fuel cell controller 160 may be configured to transmit an open command to the purge valve 130 to maintain the concentration of the fuel (hydrogen), and transmit an open command to the drain valve 140 to exhaust the water produced from power generation.

For the oxygen supply system, the fuel cell controller 160 may be configured to transmit an open command to the air blocking valve 191 to maintain the concentration of oxygen. The fuel cell controller 160 may then be configured to determine whether the pressure sensor 150 or the plurality of valves 120, 130, 140, 191 are faulty by comparing increasing or decreasing time of pressure detected by the pressure sensor 150 (e.g., first, second, and third pressure sensors 150a, 150b, and 150c) with a reference range of time delay, in response to opening/closing of the plurality of valves 120, 130, 140, 191.

Specifically, the fuel cell controller 160 may be configured to determine whether the pressure is increasing normally by comparing the pressure increase time taken for the value of the pressure sensor to increase up to (e.g., reach) a reference value as the fuel supply valve 120 is opened. In this regard, the fuel supply valve 120 may be a hydrogen supply valve 120a of FIG. 2 configured to supply or block the hydrogen stored in the hydrogen storage tank 180, or the air supplier 195 of FIG. 3 configured to supply or block air. Depending on the respective valves, hydrogen may be supplied from the hydrogen storage tank 180, or air may be supplied from outside. When the pressure increase time is beyond the reference range of time delay, the fuel cell controller 160 may be configured to determine that the pressure sensor 150 is faulty or that the fuel supply valve 120 has failed to be opened or closed. A reference range of time delay to determine a failure of the pressure sensor 150 and a reference range of time delay to determine a failure to open/close the fuel supply valve 120 may be set differently.

Furthermore, the fuel cell controller 160 may be configured to detect a leak of fuel, or whether the purge valve 130, the drain valve 140 or the air blocking valve 191 is faulty, based on the increasing and decreasing time of pressure of the pressure sensor measured in response to opening of the purge valve 130 and the drain valve 140 (e.g., the air blocking valve 191 for the oxygen supply system), and in this regard, the respective reference ranges of time delay to detect a leak of fuel (e.g., a minimal leak), or whether the purge valve 130, the drain valve 140 or the air blocking valve 191 is faulty may be set differently. Specifically, the fuel cell controller 160 may be configured to determine a state of the purge valve 130 and the discharging state by comparing the pressure decrease time taken for the value of the pressure sensor to decrease down to a reference value as the purge valve 130 is opened.

When the pressure decrease time is beyond the reference range of time delay, the fuel cell controller 160 may be configured to detect a leak of fuel or that the purge valve has a failure to be opened or closed (e.g., the valve was not successfully opened or closed). The leak of fuel refers to a minimal leak of hydrogen or oxygen, which occurs when there is a crack in the path that the fuel (hydrogen or oxygen) passes and the fuel leaks from the crack. Additionally, the fuel cell controller 160 may be configured to determine a state of the drain valve 140 and the discharging state by comparing the pressure decrease time taken for the value of the pressure sensor to decrease down to a reference value as the drain valve 140 is opened. When the pressure decrease time is beyond the reference range of time delay, the fuel cell controller 160 may be configured to detect a leak of fuel or that the drain valve has a failure to be opened or closed.

Moreover, the fuel cell controller 160 may be configured to determine a state of the purge valve 130, a state of the drain valve 140 and the discharging states by comparing the pressure decrease time taken for the value of the pressure sensor to decrease down to a reference value as the purge valve 130 and the drain valve 140 are both opened. The fuel cell controller 160 may further be configured to determine a state of the air blocking valve 191 and the discharging state by comparing the pressure decrease time taken for the value of the pressure sensor to decrease down to a reference value as the air blocking valve 191 is opened. The respective reference ranges of time delay to determine failures of the pressure sensor, the fuel supply valve, the purge valve, the drain valve, and the air blocking valve may be different, without being limited thereto.

Furthermore, the fuel cell controller 160 may be configured to determine whether the pressure sensor 150 or the plurality of valves 120, 130, 140, 191 have a fault or malfunction, and in response to determining a failure or malfunction the pressure sensor 150 or the plurality of valves 120, 130, 140, 191, the fuel cell controller 160 may be configured to output an indication of the fault, or operate the battery (not shown), which is an auxiliary power source. The fuel cell controller 160 may be configured to output diagnosis results as fault indications as shown in the following table 1 to help the user take follow-up measures. Although not shown, the fuel cell system 100 may naturally include a display configured to output the fault indications in words and/or in sound.

These criteria of the diagnosis results may be set in advance not for the drain valve 140 and also for the fuel supply valve 120, purge valve 130, and air blocking valve 191.

TABLE 1

| classification | number | first pressure sensor | | second pressure sensor | | diagnosis results |
| | | shut → rising time | shut → falling time | shut → rising time | shut → falling time | |
| --- | --- | --- | --- | --- | --- | --- |
| drain valve opened/shut | 1 | 0 | 0 | 0 | 0 | no fault |
| | 2 | 0 | 0 | 0 | 1 | decrease in decrease time of the second pressure sensor: doubt a leak around the exit of the fuel cell module 2 (second fuel unit cell) |
| | 3 | 0 | 0 | 1 | 0 | increase in increase time of the second pressure sensor: fault in closing the drain valve decrease in increase time of the second pressure sensor: X |
| | 4 | 0 | 0 | 1 | 1 | offset fault of the second pressure sensor |
| | 5 | 0 | 1 | 0 | 0 | decrease in decrease time of the first pressure sensor: doubt a leak around the exit of the fuel cell module 1 (first fuel unit cell) |

TABLE 1-continued

| classification | number | first pressure sensor shut → rising time | first pressure sensor shut → falling time | second pressure sensor shut → rising time | second pressure sensor shut → falling time | diagnosis results |
|---|---|---|---|---|---|---|
| | 6 | 0 | 1 | 0 | 1 | increase in decrease time of the first pressure sensor: fault in opening the drain valve<br>increase in decrease time of the first, second pressure sensors fault in opening the drain valve<br>decrease in decrease time of the first, second pressure sensors doubt a leak in fluid path of inlet/outlet of a fuel cell<br>increase in decrease time of the first pressure sensor, decrease in decrease time of the second pressure sensor: difference in internal pressure between fuel cell modules 1 and 2 exceeds a reference<br>decrease in decrease time of the first pressure sensor, increase in decrease time of the second pressure sensor: difference in internal pressure between fuel cell modules 1 and 2 exceeds a reference |
| | 7 | 0 | 1 | 1 | 0 | increase in decrease time of the first pressure sensor, increase in increase time of the second pressure sensor: doubt a difference in pressure, i.e., low pressure of fuel cell module 1 and high pressure of fuel cell module 2; doubt a leak in fuel cell module 2<br>decrease in decrease time of the first pressure sensor, decrease in increase time of the second pressure sensor: doubt a difference in pressure i.e., high pressure of fuel cell module 1 and low pressure of fuel cell module 2<br>increase in decrease time of the first pressure sensor, decrease in increase time of the second pressure sensor: doubt a difference in pressure i.e., low pressure of fuel cell module 1 and low pressure of fuel cell module 2<br>decrease in decrease time of the first pressure sensor, increase in increase time of the second pressure sensor: doubt a difference in pressure, i.e., high pressure of fuel cell module 1 and high pressure of fuel cell module 2; doubt a leak in fuel cell module 1 |
| | 8 | 0 | 1 | 1 | 1 | combined results of number 4 and number 5 |
| | 9 | 1 | 0 | 0 | 0 | increase in increase time of the first pressure sensor: doubt a fault in closing the drain valve or doubt a leak in fuel cell module<br>decrease in increase time of the first pressure sensor: X |
| | 10 | 1 | 0 | 0 | 1 | increase in increase time of the first pressure sensor, increase in decrease time of the second pressure sensor: doubt a difference in pressure, i.e., high pressure of fuel cell module 1 |

TABLE 1-continued

| classification | number | first pressure sensor shut → rising time | first pressure sensor shut → falling time | second pressure sensor shut → rising time | second pressure sensor shut → falling time | diagnosis results |
|---|---|---|---|---|---|---|
| | | | | | | and low pressure of fuel cell module 2; doubt a leak in fuel cell module 1 |
| | | | | | | decrease in increase time of the first pressure sensor, decrease in decrease time of the second pressure sensor: doubt a difference in pressure i.e., low pressure of fuel cell module 1 and high pressure of fuel cell module 2 |
| | | | | | | increase in increase time of the first pressure sensor, decrease in decrease time of the second pressure sensor: doubt a difference in pressure, i.e., high pressure of fuel cell module 1 and high pressure of fuel cell module 2; doubt a leak in fuel cell module 2 |
| | | | | | | decrease in increase time of the first pressure sensor, increase in decrease time of the second pressure sensor: doubt a difference in pressure i.e., low pressure of fuel cell module 1 and low pressure of fuel cell module 2 |
| | 11 | 1 | 0 | 1 | 0 | combination of number 3 and number 9 |
| | 12 | 1 | 0 | 1 | 1 | combination of number 4 and number 9 |
| | 13 | 1 | 1 | 0 | 0 | offset fault of the first pressure sensor |
| | 14 | 1 | 1 | 0 | 1 | combination of number 13 and number 2 |
| | 15 | 1 | 1 | 1 | 0 | combination of number 13 and number 3 |
| | 16 | 1 | 1 | 1 | 1 | combination of all cases |

Figure 4:
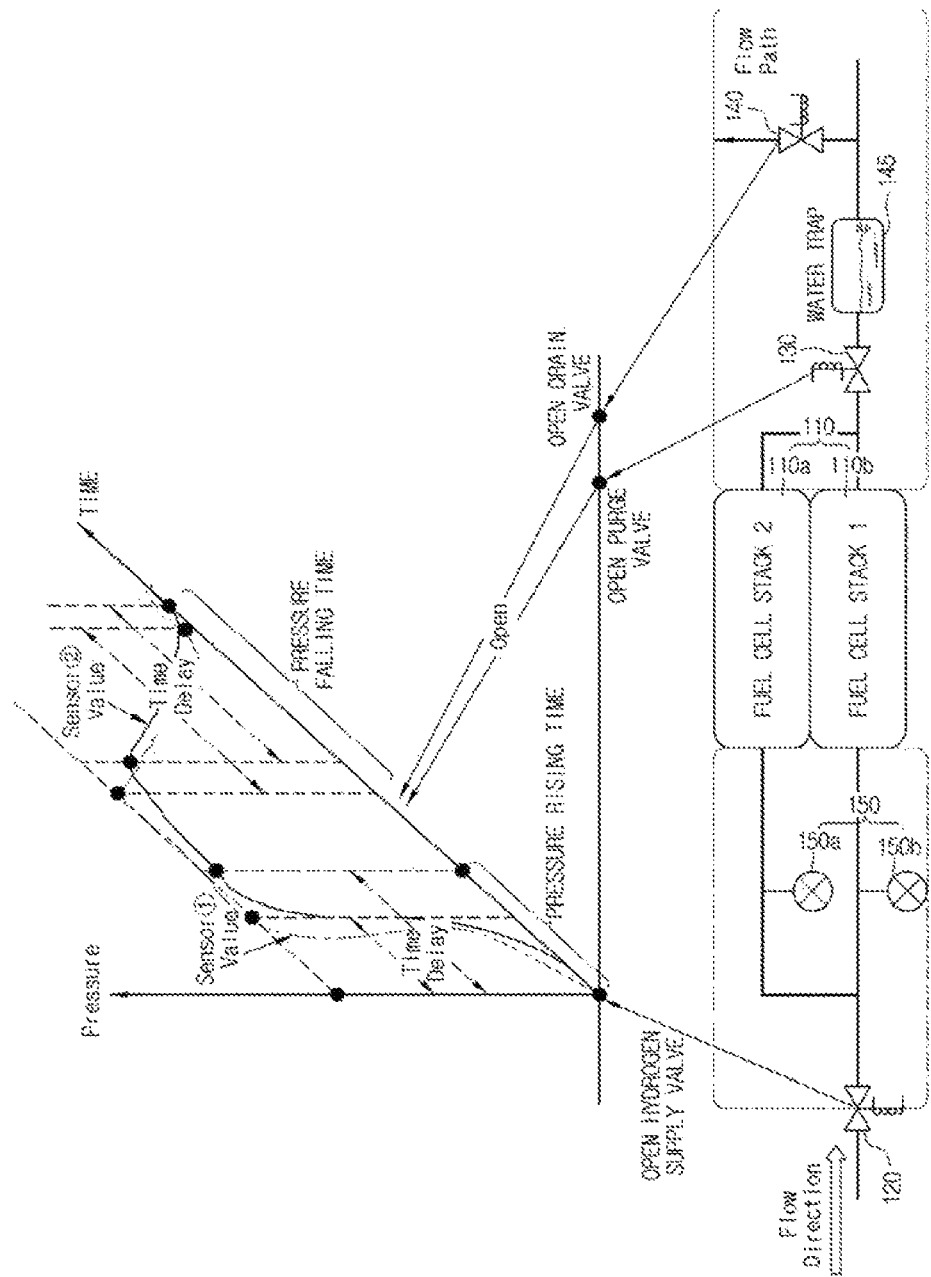
FIG. 4 shows delay in increasing and decreasing time of pressure in response to open/close operation of a valve in a hydrogen supply system according to an exemplary embodiment of the present disclosure.
Figure 5:
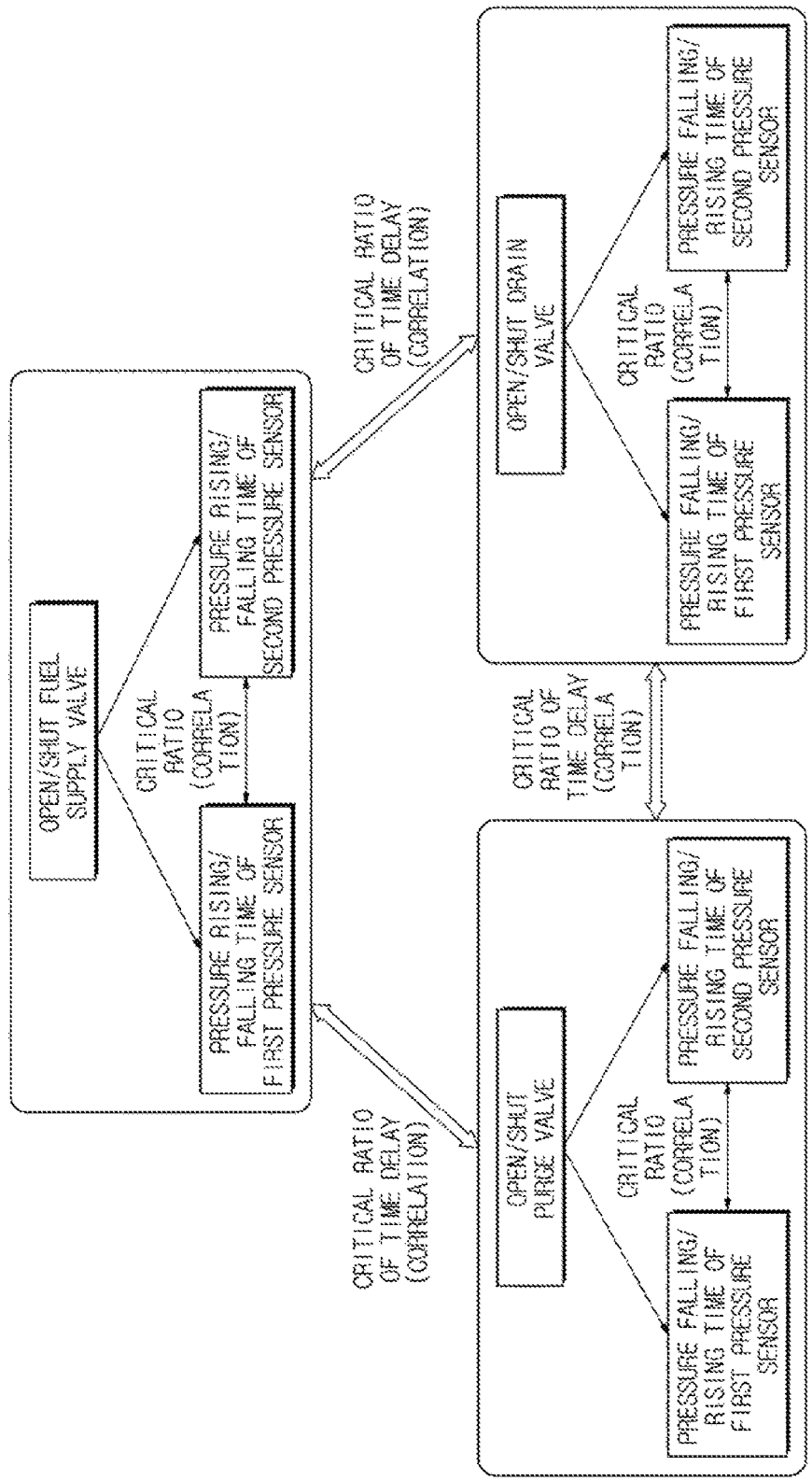
FIG. 5 is a diagram for explaining a method for determining faults in a pressure sensor or a valve according to an exemplary embodiment of the present disclosure.

FIG. 4 shows delay in increase and decrease time of pressure in response to open/close operation of a valve in a hydrogen supply system, and FIG. 5 is a diagram illustrating a method for determining failures in a pressure sensor or a valve. In FIG. 4, a hydrogen supply valve taken as an example of the fuel supply valve will be described.

Referring to FIG. 4, once the hydrogen supply valve 120a is opened, the fuel cell controller 160 may be configured to determine whether the pressure is increasing normally by comparing time taken for values of the first and second pressure sensors 150a and 150b to increase into a certain range with a reference range of time delay.

For example, the fuel cell controller 160 may be configured to determine that a fault in the increase of the pressure occurs when the pressure increase time is beyond the reference range of time delay, and output a corresponding fault indication. Once the purge valve 130 or the drain valve 140 is opened, the fuel cell controller 160 may be configured to determine whether the purge valve 130 or the drain valve 140 has a fault and whether the state of exhaust is normal (e.g., without error) by comparing time taken for values of the first and second pressure sensors 150a and 150b to fall with the reference range of time delay.

Referring to FIG. 5, since the first and second pressure sensors 150a and 150b corresponding to the fuel cell unit stacks 110a, 110b in the fuel cell, respectively, have correlations with each other according to respective opening or closing of the fuel supply valve 120, the purge valve 130, and the drain valve 140, pressure increase and decrease time of the pressure sensor 150 may be within the reference range of time delay in response to opening/closing of the valves when the valves are in the normal state, but may be beyond the reference range of time delay in response to opening/closing of the valves when the valves are in the abnormal state. The reference range of time delay may refer to any values set by the operator.

In other words, there may be a critical ratio in increase or decrease of pressure between the first and second pressure sensors 150a and 150b, a critical ratio of time delay in increase or decrease of pressure of the respective pressure sensors 150a, 150b in response to opening/closing of the valve, and a critical ratio of time delay in increase or decrease of the pressure between the plurality of valves. In particular, the fuel cell controller 160 may be configured to monitor a change in increasing or decreasing time of pressure in response to operation of the fuel supply valve, purge valve, and drain valve, and determine that an object observed to have a pattern different from a reference pattern is faulty.

The fuel cell controller 160 may also be configured to determine which one of the first and second pressure sensors 150a and 150b has a malfunction, once the valve that has a pattern of pressure increase or decrease time different from the reference pattern is determined. For example, as shown in table 1, results of the diagnosis are preset whether the pressure increase or decrease time of the first and second pressure sensors 150a and 150b is beyond the reference range of time delay in response to opening/closing of the drain valve 140. The results of the diagnosis shown in table 1 may be preset and applied to the purge valve 130 and the fuel supply valve 120 as well. The fuel cell controller 160 may be configured to determine a matching diagnosis result, based on whether the pressure increase or decrease time determined by monitoring a detection result of the pressure sensor 150 in response to opening/closing of the plurality of valves 120, 130, 140, 191.

Figure 6:
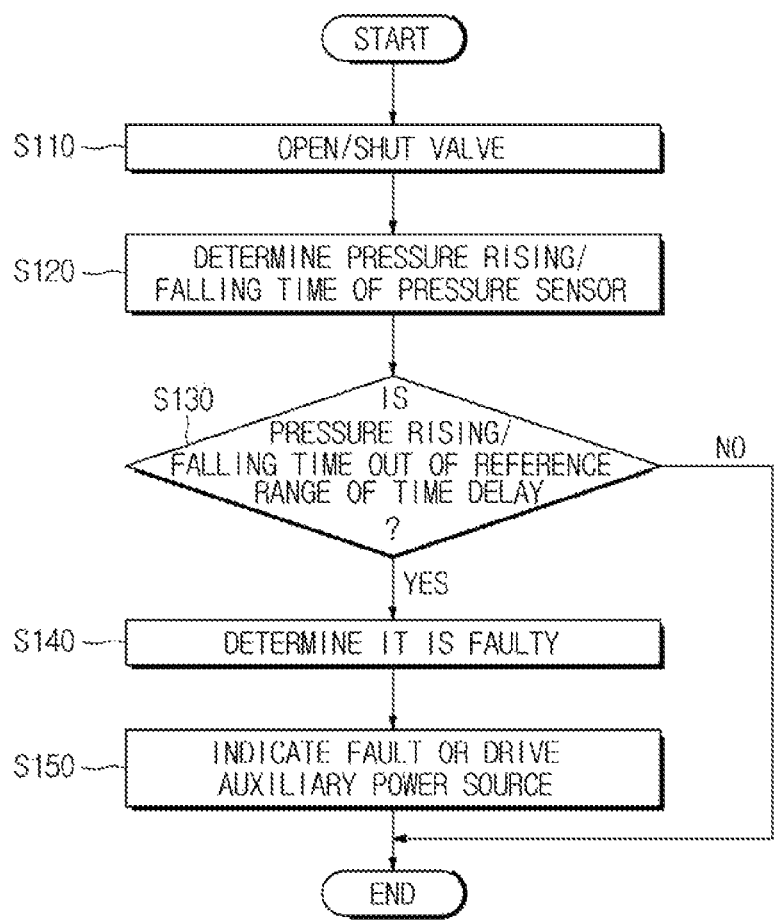
FIG. 6 is a flowchart illustrating a method for controlling a fuel cell system according to an exemplary embodiment of the present disclosure.

FIG. 6 is a flowchart illustrating a method for controlling a fuel cell system. Referring to FIG. 6, the fuel cell system 100 may be configured to operate the plurality of valves 120, 130, 140, 191 of the fuel cell stack 110 to be opened or closed, in S110. The plurality of valves may include the fuel supply valve 120, the purge valve 130, the drain valve 140, and the air blocking valve 191.

In particular, the fuel supply valve 120 may be a hydrogen supply valve 120a or an air supplier 195. The fuel cell system 100 may be configured to determine increase or decrease time of pressure detected by the plurality of pressure sensors 150a, 150b, 150c, in S120. The fuel cell system 100 may further be configured to determine whether the pressure increase or decrease time is beyond the reference range of time delay by comparing the determined pressure increase or decrease time with the reference range of time delay, in S130. When the comparison result reveals that the pressure increase or decrease time is beyond the reference range of time delay, the fuel cell system 100 may be configured to detect a failure in the plurality of pressure sensors 150a, 150b, 150c or the plurality of valves 120, 130, 140, 191, in S140.

The fuel cell system 100 may then be configured to output indications of the fault, or operate the battery (not shown), which is the auxiliary power source, in S150. Specifically, the fuel cell system 100 may be configured to output the diagnosis results as fault indications as shown in table 1 to help the user take follow-up measures. Furthermore, the fuel cell system 100 may also be configured to operate the battery (not shown), which is the auxiliary power source, as needed.

When the fuel supply valve 120 is opened in S110, when the pressure increase time taken for the value of the pressure sensor to increase up to a reference value is beyond the reference range of time delay in S140, the fuel cell system 100 may be configured to determine that the pressure sensor 150 is faulty or the fuel supply valve 120 has failed to be opened or closed. When the purge valve 130 is opened in S110, when the pressure increase time taken for the value of the pressure sensor to decrease down to a reference value is beyond the reference range of time delay in S140, the fuel cell system 100 may be configured to detect a leak of fuel or that the purge valve 120 has failed to be opened or closed.

When the drain valve 140 is opened in S110, when the pressure increase time taken for the value of the pressure sensor to decrease down to a reference value is beyond the reference range of time delay in S140, the fuel cell system 100 may be configured to detect a leak of fuel or that the drain valve 120 has failed to be opened or closed. When the purge valve and the drain valve 140 are both opened in S110, when the pressure increase time taken for the value of the pressure sensor to decrease down to a reference value is beyond the reference range of time delay in S140, the fuel cell system 100 may be configured to determine that the purge valve and the drain valve are faulty and the discharging state is abnormal.

Figure 7:
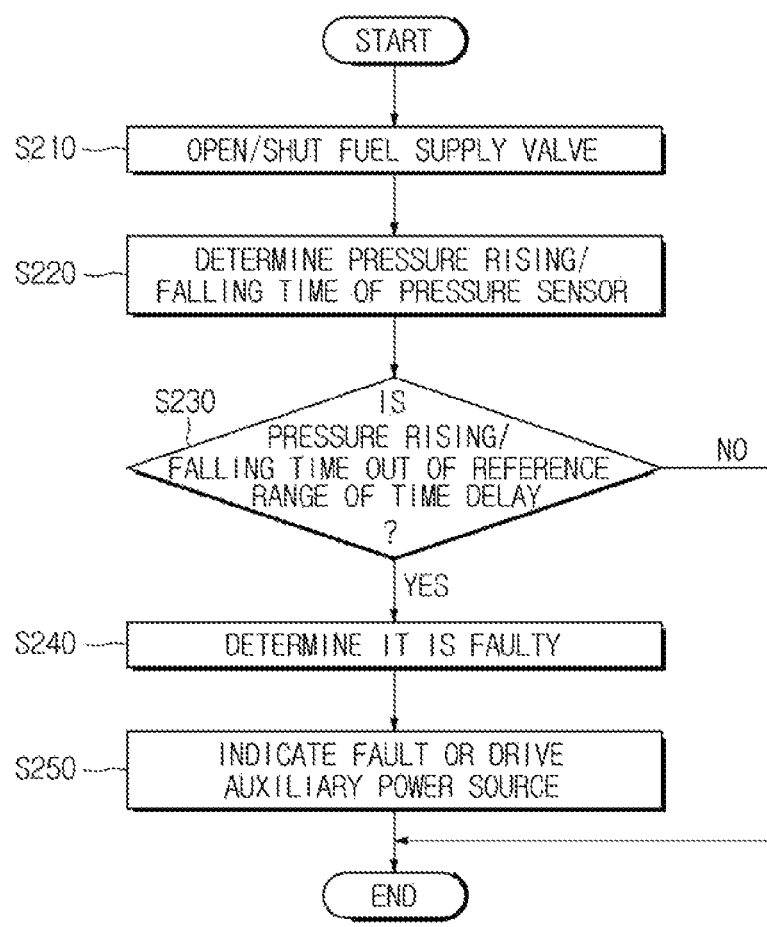
FIG. 7 is a flowchart illustrating a method for controlling a fuel cell system, according to an exemplary embodiment of the present disclosure.

FIG. 7 is a flowchart illustrating a method for controlling a fuel cell system, according to an exemplary embodiment of the present disclosure, in which fault diagnosis in opening/closing of a fuel supply valve will be described as an example. Detailed description overlapping with that in connection with FIG. 6 will be omitted herein. Referring to FIG. 7, the fuel cell system 100 may be configured to operate the fuel supply valve 120 (e.g., the hydrogen supply valve 120a or the air supplier 195) of the fuel cell stack 110 to be opened or closed, in S210.

The fuel cell system 100 may be configured to determine increase or decrease time of pressure detected by the plurality of pressure sensors 150a, 150b, 150c, in S220. The fuel cell system 100 may further be configured to determine whether the pressure increase or decrease time is beyond the reference range of time delay by comparing the determined pressure increase or decrease time with the reference range of time delay, in S230. When the comparison result reveals that the pressure increase or decrease time is beyond the reference range of time delay, the fuel cell system 100 may be configured to detect a fault in the plurality of pressure sensors 150a, 150b, 150c or that the fuel supply valve 120 has failed to be opened or closed, in S240. The fuel cell system 100 may then be configured to output indications of the fault, or operate the battery (not shown), which is the auxiliary power source, in S250.

Figure 8:
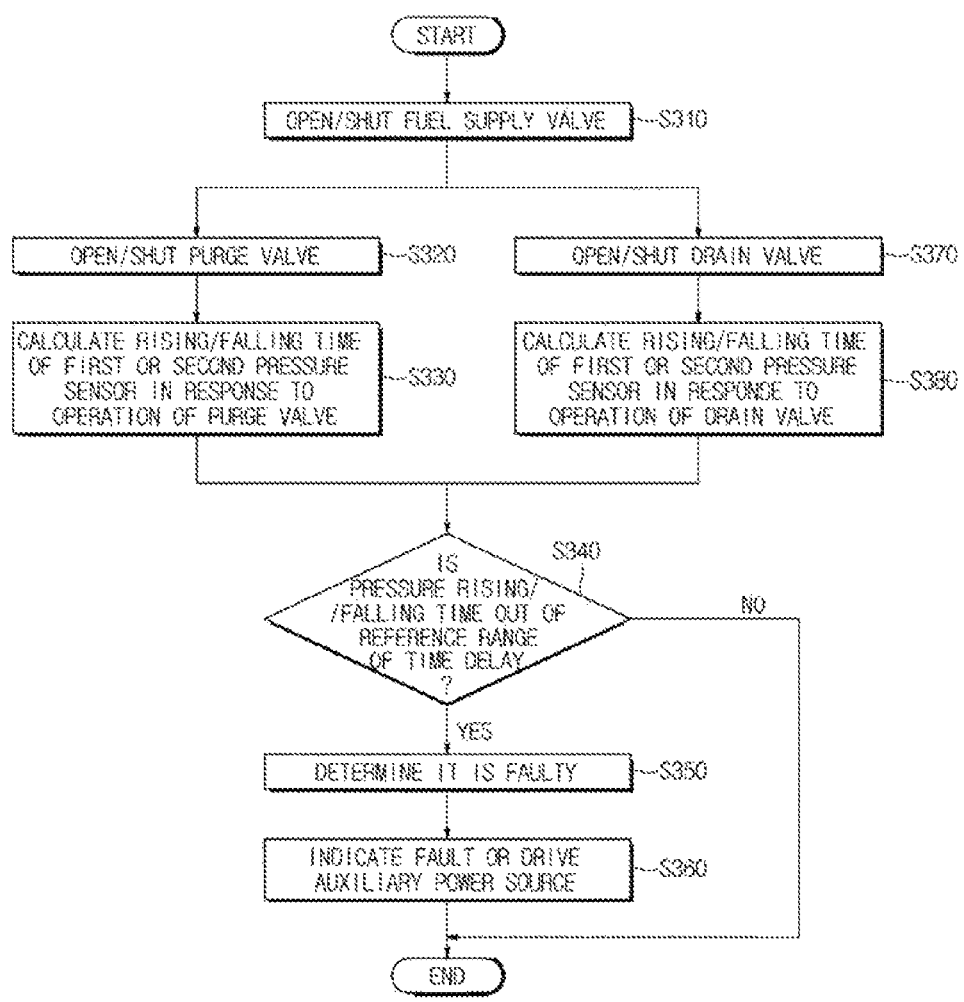
FIG. 8 is a flowchart illustrating a method for controlling a fuel cell system, according to another exemplary embodiment of the present disclosure.

FIG. 8 is a flowchart illustrating a method for controlling a fuel cell system, according to another exemplary embodiment of the present disclosure, in which fault diagnosis in opening/closing of a purge valve and a drain valve will be described an example. Detailed description overlapping with that in connection with FIG. 6 will be omitted herein. Referring to FIG. 8, the fuel cell system 100 may be configured to operate the fuel supply valve 120 (the hydrogen supply valve 120a) of the fuel cell stack 110 to be opened or closed, in S310, and may be configured to operate the purge valve 130 to be opened or closed, in S320.

The fuel cell system 100 may be configured to determine increase or decrease time of pressure detected by the plurality of pressure sensors 150a, 150b in relation to the purge valve 130, in S330. The fuel cell system 100 may further be configured to determine whether the pressure increase or decrease time is beyond the reference range of time delay by comparing the determined pressure increase or decrease time with the reference range of time delay, in S340. When the comparison result reveals that the pressure increase or decrease time is beyond the reference range of time delay, the fuel cell system 100 may be configured to detect a leak of fuel or the purge valve 130 has failed to be opened or closed, in S350.

The fuel cell system 100 may then be configured to output indications of the fault, or operate the battery (not shown), which is the auxiliary power source, in S360. The fuel cell system 100 may further be configured to operate the fuel supply valve 120 of the fuel cell stack 110 to be opened or closed, in S310, and operate the drain valve 140 to be opened or closed, in S370. Additionally, the fuel cell system 100 may be configured to determine increase or decrease time of pressure detected by the pressure sensors 150a, 150b in relation to the drain valve 140, in S380. The process may then perform operation S340. When the comparison result reveals that the pressure increase or decrease time is beyond the reference range of time delay, the fuel cell system 100 may be configured to detect a leak of fuel or the drain valve 140 has failed to be opened or closed, in S350. The process may then perform operation S360.

Although only the purge valve and drain valve were described as an example in FIG. 8, it may be possible to detect the leak of fuel or a fault in opening or closing the air blocking valve 191 based on increase or decrease time of pressure measured by the pressure sensors 150a, 150b, 150c in response to opening/closing of the air blocking valve 191, after air was supplied in response to operation of the air supplier 195.

According to exemplary embodiments of the present disclosure, diagnosis of faults of valves and pressure sensors may both be performed, since diagnosis of a fault in fuel supply may be performed based on a correlation of delay in increase or decrease time of the pressure of a pressure sensor installed in the entrance of a fuel cell unit stack in response to operations of a fuel supply valve, a purge valve, and a drain valve, which affect changes in pressure of fuel supply in the fuel cell system. Furthermore, it may also be possible to determine a more accurate position of fault in the valve or the pressure sensor having a fault or failure.

Several exemplary embodiments have been described, but a person of ordinary skill in the art will understand and appreciate that various modifications can be made without departing the scope of the present disclosure. Thus, it will be apparent to those ordinary skilled in the art that the disclosure is not limited to the exemplary embodiments described, which have been provided only for illustrative purposes.

What is claimed is:

1. A fuel cell system, comprising:
    a fuel cell stack;
    a plurality of valves operated to be selectively opened or closed to supply fuel to the fuel cell stack and remove impurities;
    a pressure sensor configured to detect a state of pressure of fuel supplied to the fuel cell stack; and
    a fuel cell controller configured to determine whether the pressure sensor or the plurality of valves are faulty by comparing increase or decrease time of the pressure detected by the pressure sensor with a reference range of time delay, as the plurality of valves are operated to be opened or closed,
    wherein the plurality of valves include a fuel supply valve, a purge valve, a drain valve, and an air blocking valve, and the reference range of time delay being different for each of the fuel supply valve, the purge valve, the drain valve, and the air blocking valve for determining the fault of the plurality of valves.

2. The fuel cell system of claim 1,
    wherein the fuel supply valve includes a hydrogen supply valve or an air supplier.

3. The fuel cell system of claim 2, wherein the fuel cell controller is configured to
    determine whether the pressure is increasing normally by comparing pressure increase time taken for a value of the pressure sensor to increase to a reference value with the reference range of time delay, as the fuel supply valve is opened.

4. The fuel cell system of claim 3, wherein the fuel cell controller is configured to
    determine that the pressure sensor is faulty or the fuel supply valve has failed to be opened or closed when the pressure rising time is beyond the reference range of time delay.

5. The fuel cell system of claim 2, wherein the fuel cell controller is configured to
    determine a state of the purge valve and the discharging state by comparing pressure decrease time taken for a value of the pressure sensor to decrease to a reference value with the reference range of time delay, as the purge valve is opened.

6. The fuel cell system of claim 5, wherein the fuel cell controller is configured to
    detect a leak of fuel or the purge valve has failed to be opened or closed when the pressure decrease time is beyond the reference range of time delay.

7. The fuel cell system of claim 2, wherein the fuel cell controller is configured to
    determine a state of the drain valve and the discharging state by comparing pressure decrease time taken for a value of the pressure sensor to decrease to a reference value with the reference range of time delay, as the drain valve is opened.

8. The fuel cell system of claim 7, wherein the fuel cell controller is configured to
    detect a leak of fuel or the drain valve has failed to be opened or closed when the pressure decrease time is beyond the reference range of time delay.

9. The fuel cell system of claim 2, wherein the fuel cell controller is configured to
    determine a state of the purge valve, a state of the drain valve and the discharging state by comparing pressure decrease time taken for a value of the pressure sensor to decrease to a reference value with the reference range of time delay, as the purge valve and the drain valve are both opened.

10. The fuel cell system of claim 1, wherein the fuel cell controller is configured to
    determine whether the pressure sensor or the plurality of valves are faulty, and in response to determining that the pressure sensor or the plurality of valves are faulty, output an indication of the fault or operate an auxiliary power source.

11. A method for controlling a fuel cell system, comprising:
    operating, by a controller, a plurality of valves of a fuel cell stack to be opened or closed;
    determining, by a controller, increase or decrease time of pressure detected by a plurality of pressure sensors;
    comparing, by a controller, the determined pressure increase or decrease time with a reference range of time delay; and
    determining, by a controller, from the comparison that the plurality of pressure sensors or the plurality of valves are faulty if the pressure increase or decrease time is beyond the reference range of time delay,
    wherein the plurality of valves include a fuel supply valve, a purge valve, a drain valve and an air blocking valve, and the reference range of time delay being different for each of the fuel supply valve, the purge valve, the drain valve, and the air blocking valve for determining the fault of the plurality of valves.

12. The method of claim 11,
    wherein the fuel supply valve includes a hydrogen supply valve or an air supplier.

13. The method of claim 12, wherein when the fuel supply valve is opened, the determination from the comparison that the plurality of pressure sensors or the plurality of valves are faulty when the pressure increase or decrease time is beyond the reference range of time delay includes:
    determining, by a controller, that the pressure sensor is faulty or the fuel supply valve has failed to be opened or closed when the pressure increase time taken for a value of the pressure sensor to increase to a reference value is beyond the reference range of time delay.

14. The method of claim 12, wherein when the purge valve is opened, the determination from the comparison that the plurality of pressure sensors or the plurality of valves are faulty when the pressure increase or decrease time is beyond the reference range of time delay includes:
- detecting, by a controller, a leak of fuel or the purge valve has a failure to be opened or closed when the pressure decrease time taken for a value of the pressure sensor to decrease to a reference value is beyond the reference range of time delay.

15. The method of claim 12, wherein when the drain valve is opened, the determination from the comparison that the plurality of pressure sensors or the plurality of valves are faulty when the pressure increase or decrease time is beyond the reference range of time delay includes:
- detecting, by a controller, a leak of fuel or the drain valve has failed to be opened or closed the pressure decrease time taken for a value of the pressure sensor to decrease to a reference value is beyond the reference range of time delay.

16. The method of claim 12, wherein when the purge valve and the drain valve are both opened, the determination from the comparison that the plurality of pressure sensors or the plurality of valves are faulty when the pressure increase or decrease time is beyond the reference range of time delay includes:
- determining, by a controller, that the purge valve and drain valve are faulty and the discharging state is abnormal when the pressure decrease time taken for a value of the pressure sensor to decrease to a reference value is beyond the reference range of time delay.

17. The method of claim 11, further comprising:
- after determining from the comparison that the plurality of pressure sensors or the plurality of valves are faulty when the pressure increase or decrease time is beyond the reference range of time delay, outputting, by a controller, an indication of the fault or operating an auxiliary power source.

* * * * *